(12) United States Patent
Bhola

(10) Patent No.: US 8,899,302 B2
(45) Date of Patent: Dec. 2, 2014

(54) MOLD VALVE

(76) Inventor: Mahase Bhola, Brampton (CA)

( * ) Notice: Subject to any disclaimer, the term of this patent is extended or adjusted under 35 U.S.C. 154(b) by 0 days.

(21) Appl. No.: 13/427,014

(22) Filed: Mar. 22, 2012

(65) Prior Publication Data

US 2013/0251841 A1    Sep. 26, 2013

(51) Int. Cl.
  *B22D 17/22*    (2006.01)
(52) U.S. Cl.
  USPC ............................................. 164/305; 164/410
(58) Field of Classification Search
  USPC .................................................. 164/305, 410
  See application file for complete search history.

(56) References Cited

U.S. PATENT DOCUMENTS

| | | | | |
|---|---|---|---|---|
| 4,431,047 A | * | 2/1984 | Takeshima et al. | 164/253 |
| 4,986,338 A | * | 1/1991 | Yamauchi et al. | 164/457 |
| 4,997,026 A | * | 3/1991 | Ozeki et al. | 164/305 |
| 5,361,826 A | * | 11/1994 | Yamauchi et al. | 164/457 |
| 6,513,570 B2 | * | 2/2003 | Ratte | 164/312 |
| 7,174,947 B2 | * | 2/2007 | Olmsted | 164/312 |
| 8,176,968 B1 | * | 5/2012 | Eshleman et al. | 164/113 |
| 2001/0001978 A1 | * | 5/2001 | Hosoi et al. | 164/91 |

* cited by examiner

*Primary Examiner* — Kevin P Kerns
(74) *Attorney, Agent, or Firm* — Elias Borges

(57) ABSTRACT

There is provided an improved valve mechanism for use with a casting or injection mold which is quick acting and simple to construct. The valve includes an inlet coupled to the mold cavity and an outlet for venting gas from the mold cavity. The valve further includes a closure oriented perpendicularly to the inlet and movable between open and closed positions for closing off the outlet. The closure has a central axis and the valve is configured to move the closure into the closed position by directing the melt passing through the inlet to impinge substantially coaxially upon the closure so as to transfer a majority of the momentum of the melt to the closure.

5 Claims, 7 Drawing Sheets

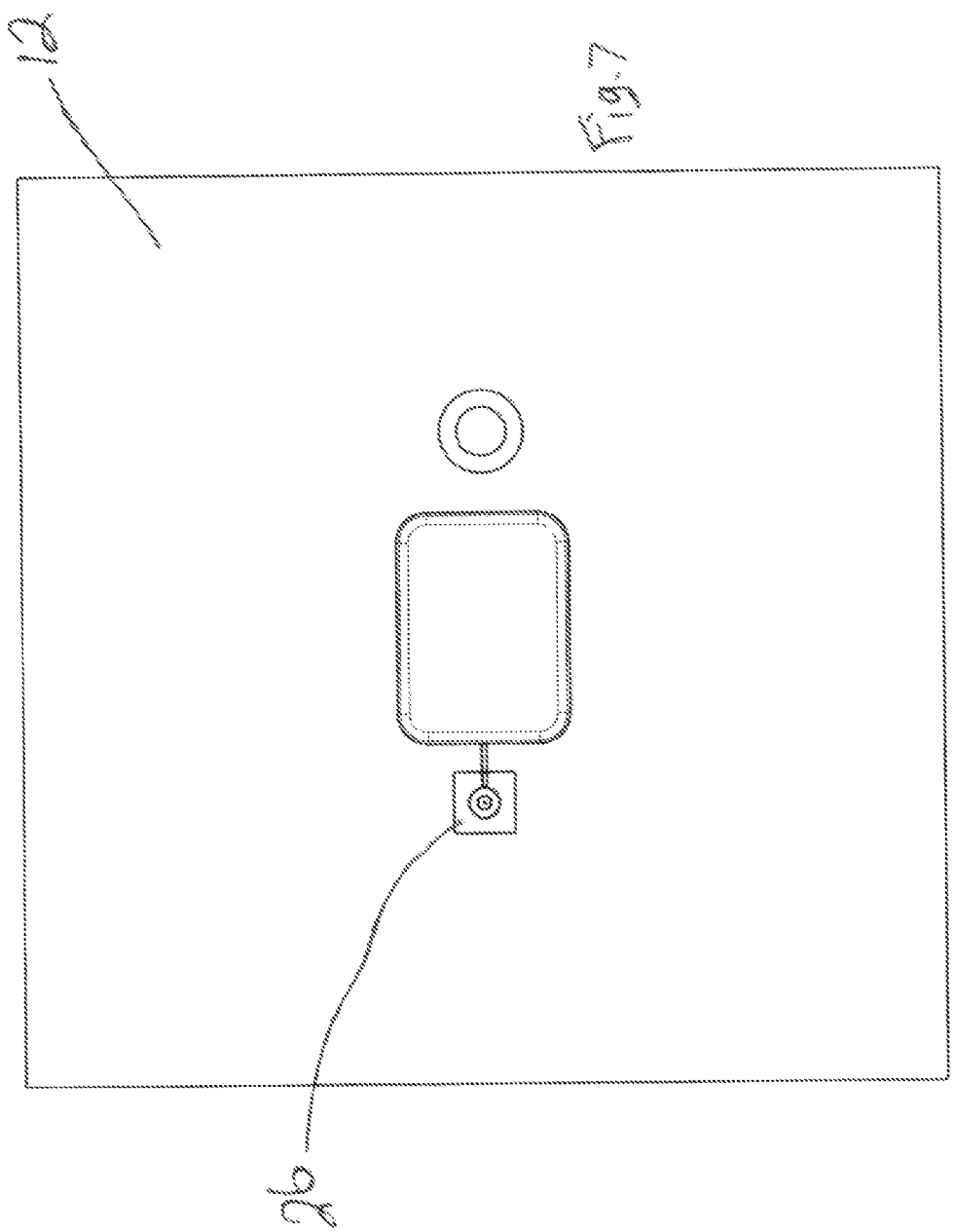

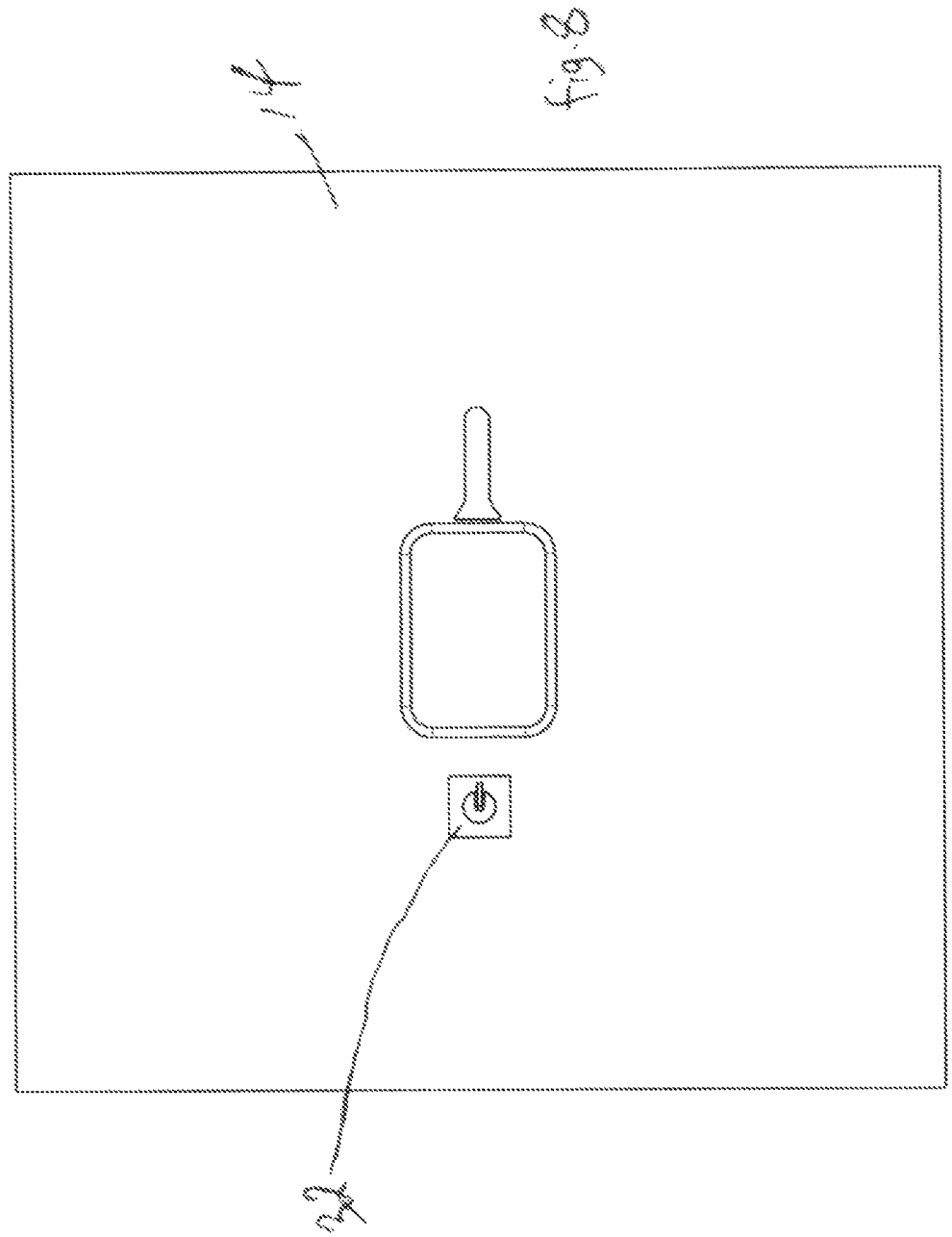

MOLD VALVE

FIELD OF THE INVENTION

The invention relates generally to venting valves for casting and/or injection molds.

BACKGROUND OF THE INVENTION

In the die-casting process, molten metal (e.g.: Aluminum) is rapidly injected in a tightly closed mould under high pressures and is then allowed to solidify. Typical injection times for large castings are in the range of 0.1 seconds at pressures of 10,000 pounds per square inch. Before injection of the molten material into the mould cavity in said molding process, gas resides in the mould cavity. The mould is held tightly closed during injection of the molten material; this prevents the molten material from escaping said cavity. The tightly closed mould also prevents said resident gases from escaping the mould cavity during the injection phase. Said resident gases become trapped in the molded part; this results in porosity in the cast part reducing its quality and may cause the manufacturer to scrap the casting.

One commonly known method of minimizing trapped gases in the molded parts is to machine thin vent passageways leading from the perimeter of the mould cavity to the exterior of the mould. If the thickness of these passageways exceed approximately 0.01 inches, then the injected material will escape the mould cavity. Molten material escaping the mould cavity is a safety hazard and it is not practiced in the industry, further it may leave deposits on the mould parting plane which affects the subsequent sealing of the mould halves and compounds itself with subsequent casting cycles causing costly down-times to repair the mould sealing surfaces. And even if this venting method is used correctly (Thickness less than 0.01 inches), the available vent area is rarely sufficient to allow the gases to adequately escape within the short cavity fill times of 0.1 seconds.

Another known method of minimizing trapped gases in the molded parts is to machine a larger passageway leading from the mould cavity to a valve. This valve is also in fluid communication with the exterior of the mould. The object of this approach is to have a larger passageway to vent the resident gases more freely. The valve is kept open for as long as possible (During the injection phase) before the injected melt arrives at the valve chamber to evacuate the maximum amount of gas from the cavity of the mould. This valve must then be rapidly closed before injected material can escape through the valve exit. The longer the valve stays open before the molten material arrives, the more gas can be allowed to escape before the valve closes. There are a number of known inventions wherein a valve is used to permit evacuation of said resident gases in the injection moulding process (eg. die-casting). The valve described in U.S. Pat. No. 4,986,338 relies on a sensor triggered electrically to activate a valve mechanism pneumatically. This invention is at a disadvantage due to its slow response to close the valve. It also requires extensive trial and error to implement for each mould constructed and even in such measures, the valve may fail to close before the molten material arrives. If the valve fails to close in time, molten material will flow through the valve exit and fill the exhaust passageways with molten material which subsequently solidifies. This causes costly down time to remove the solidified material and to service the valve.

Another invention similar to this claim is outlined in U.S. Pat. No. 4,431,047 wherein a slidable plunger is used to permit (or block) fluid communication from the valve chamber to the mould exterior. Two symmetrical bypass passageways leading to the valve exit provide time to close the valve before molten material can flow through the valve exit. The position of said bypass passages requires a large valve that must be assembled at the exterior perimeter of the mould. The by-pass passageways are necessary to provide the time to close the valve before molten material arrives at the valve exit. There are two disadvantages to this arrangement: Firstly, a large valve limits the choices for where the valve can be installed without significant modification to the mould; this severely limits its effectiveness as it is vital to position the valve at the last-to-fill feature of the mould. Secondly, molten material (under high pressure) channeled to the outer perimeter of the mould makes it difficult to seal the passage leading to the valve from the mould cavity. This is due to thermal expansion of the mould center which severely compromises the ability to seal the passage leading to the outer perimeter of the mould. In the 6th embodiment disclosed (U.S. Pat. No. 4,431,047), the molten metal jet does not collide with the piston in an optimum angle for maximum momentum transfer. It requires a pressure buildup in the valve chamber to forcefully close the valve is yet another disadvantage; this requires more time to force to close the valve and cause the valve chamber to be filled with molten material.

An improved valve mechanism for venting injection molds which overcomes the disadvantages of the prior is required. Such a valve mechanism should be small, simple to construct and, most importantly, responsive to seal the mold vent as quickly as possible at the most opportune time.

SUMMARY OF THE INVENTION

The goal of the present invention is to provide a venting arrangement incorporated in a die-casting mould that is small enough to be positioned close to the mould cavity without reducing the venting area. Secondly, the valve is shaped to make full use of the momentum of the incoming melt to force the valve shut. And finally to use a simple valve mechanism of small mass to further decrease the time to slide the piston from the open position to its closed position. Therefore, in accordance with one aspect of the present invention, there is provided an improved valve mechanism for an injection mold which is quick acting and simple to construct. The valve permits gas to escape from a mold cavity when the mold cavity is injected with a melt. The valve includes an inlet coupled to the mold cavity and an outlet for venting gas from the mold cavity. The valve further includes a closure oriented substantially perpendicularly to the inlet and movable between open and closed positions for closing off the outlet. The closure has a central axis and the valve is configured to move the closure into the closed position by directing the melt passing through the inlet to impinge substantially coaxially upon the closure so as to transfer a majority of the momentum of the melt to the closure.

In accordance with another aspect of the present invention, there is provided a valve for permitting gas to escape from a mold cavity when the mold cavity is injected with a melt. The valve includes an inlet coupled to the mold cavity and an outlet for venting gas from the mold cavity. The valve also includes a closure which is movable between opened and closed positions for closing off the outlet. The closure has a central axis and the valve is configured to direct the melt passing through the inlet to impinge substantially coaxially upon the closure by applying a favorable pressure gradient to the melt, thereby moving the closure into the closed position.

In accordance with yet another aspect of the present invention, there is provided a quick acting valve for venting gas from a mold cavity when the mold cavity is injected with a melt. The valve includes an inlet coupled to the mold cavity and an outlet for venting gas from the mold cavity. The valve further includes a closure member movable between open and closed positions for closing off the outlet when the closure is in its closed position. The valve is configured to move the closure member into its closed position by transferring momentum from the melt passing through the inlet to the closure member.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

FIG. 7 is a bottom view of the upper mold half of the mold shown in FIG. 2.

FIG. 8 is a top view of the lower mold half of the mold shown in FIG. 2.

In the drawings like characters of reference indicate corresponding parts in the different figures.

DETAILED DESCRIPTION OF THE INVENTION

Figure 1:
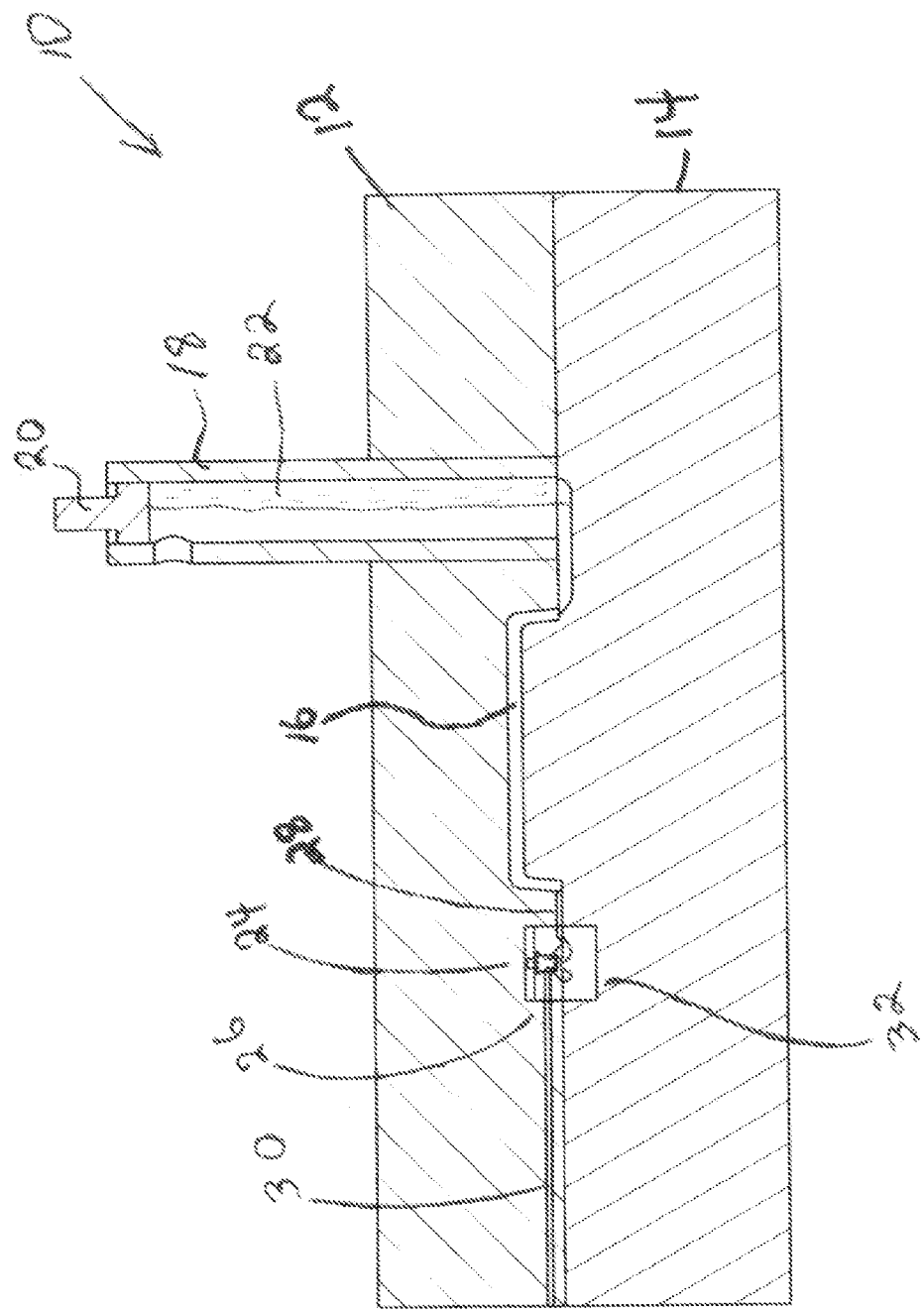
FIG. 1. is a cross section of a mold incorporating the valve mechanism of the present invention and showing the mold in its closed (molding) orientation.
Figure 2:
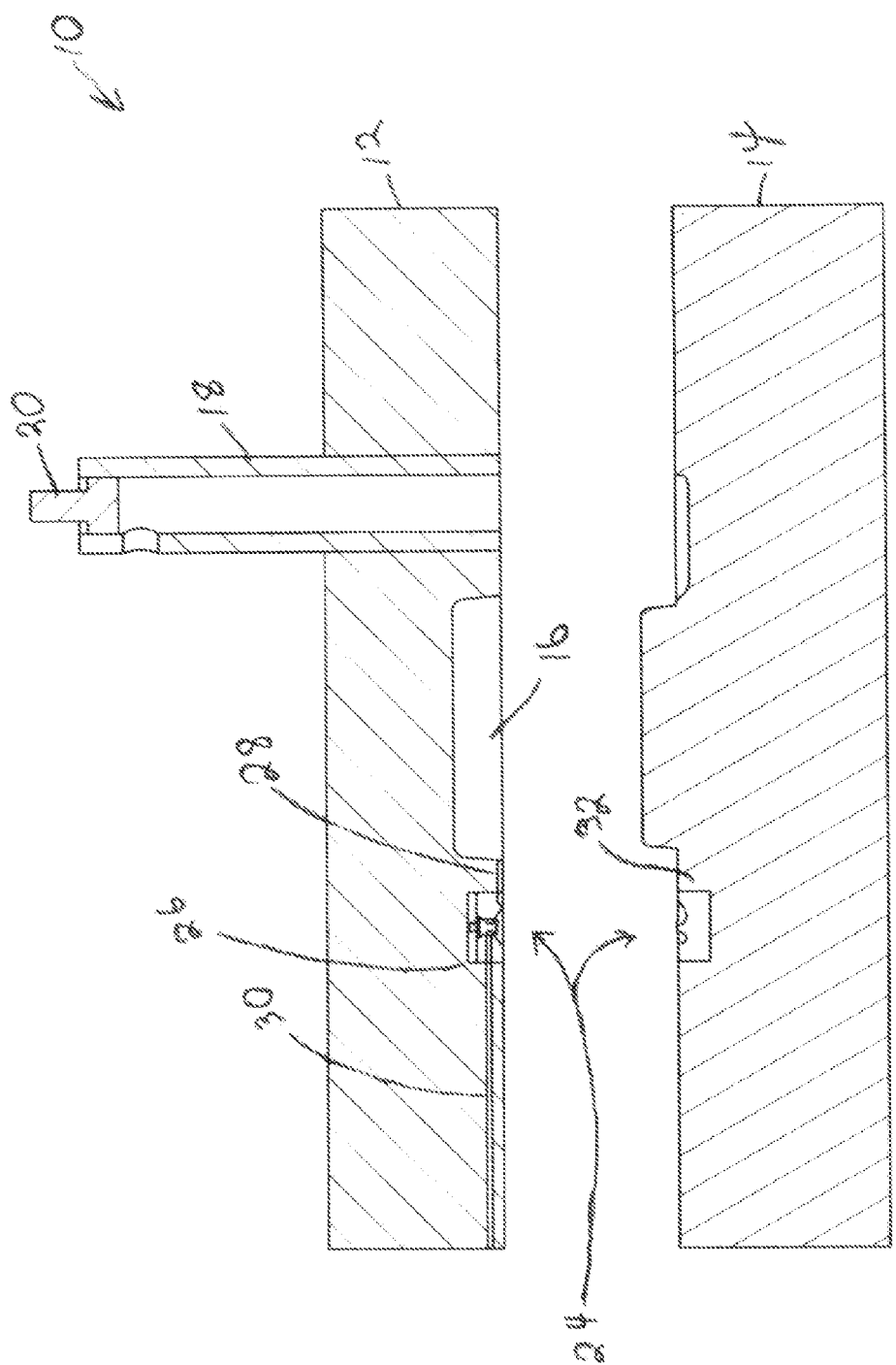
FIG. 2 is a cross section of the mold shown in FIG. 1 showing the mold in its open position with a first mold half suspended above a second mold half.

Referring to FIGS. 1 and 2, the method of die-casting occurs in a mold 10 comprise of two mould halves 12 (first or movable mold half) and 14 (second or stationary mold half) in which the mold cavity is machined in each of the die halves; this mold cavity (see item 16 in FIG. 1) defines the geometry of the part that is cast. One of the mould halves is stationary (illustrated in FIGS. 1 and 2 as the second mold half) and fixed to the die-casting machine and the other half (the movable or first mold half) is mounted to a moving platen of the die casting machine. The stationary half is connected to a cylindrical sleeve (Referred to as the "shot sleeve") 18 with a piston 20 positioned in the sleeve. The inside of the shot sleeve is in fluid communication with the cavity 16. The casting process begins with tightly closing the mould halves, pouring the melt 22 into the shot sleeve and rapidly accelerate the piston to force the molten material into the die cavity. Typical speeds as the melt enters the cavity is in the range of 50 m/s. The melt is then allowed to solidify and the casting is ejected. The mould cavity must be shaped in such a way to prevent any under-cuts so that the casting may be easily extracted from the mold.

In order to ensure that the mold cavity is completely filled with the melt, and to ensure that there is not air mixed in with the melt as the part is molded, air contained in mold cavity 16 must be vented as the melt is injected into the mold cavity. Valve 24 is formed on the mold halves as upper portion 26 and lower portion 32 and has an inlet 28 and an outlet 30. Air from mold cavity 16 is forced through inlet 28 and out of outlet 30 as the melt is injected into the mold cavity.

Figure 3:
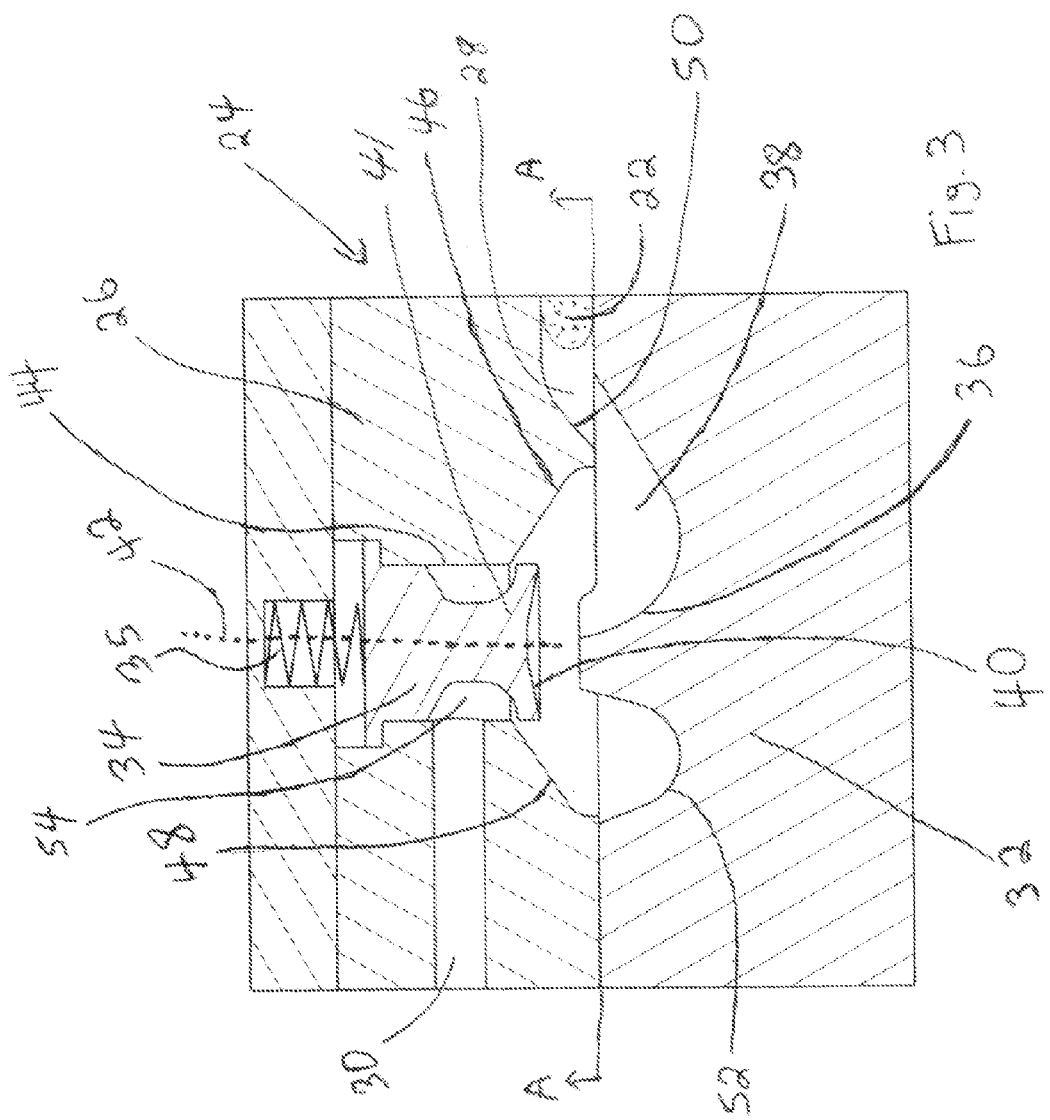
FIG. 3 is a cross section of the valve portion of the present invention showing the closure member in its opened position.
Figure 4:
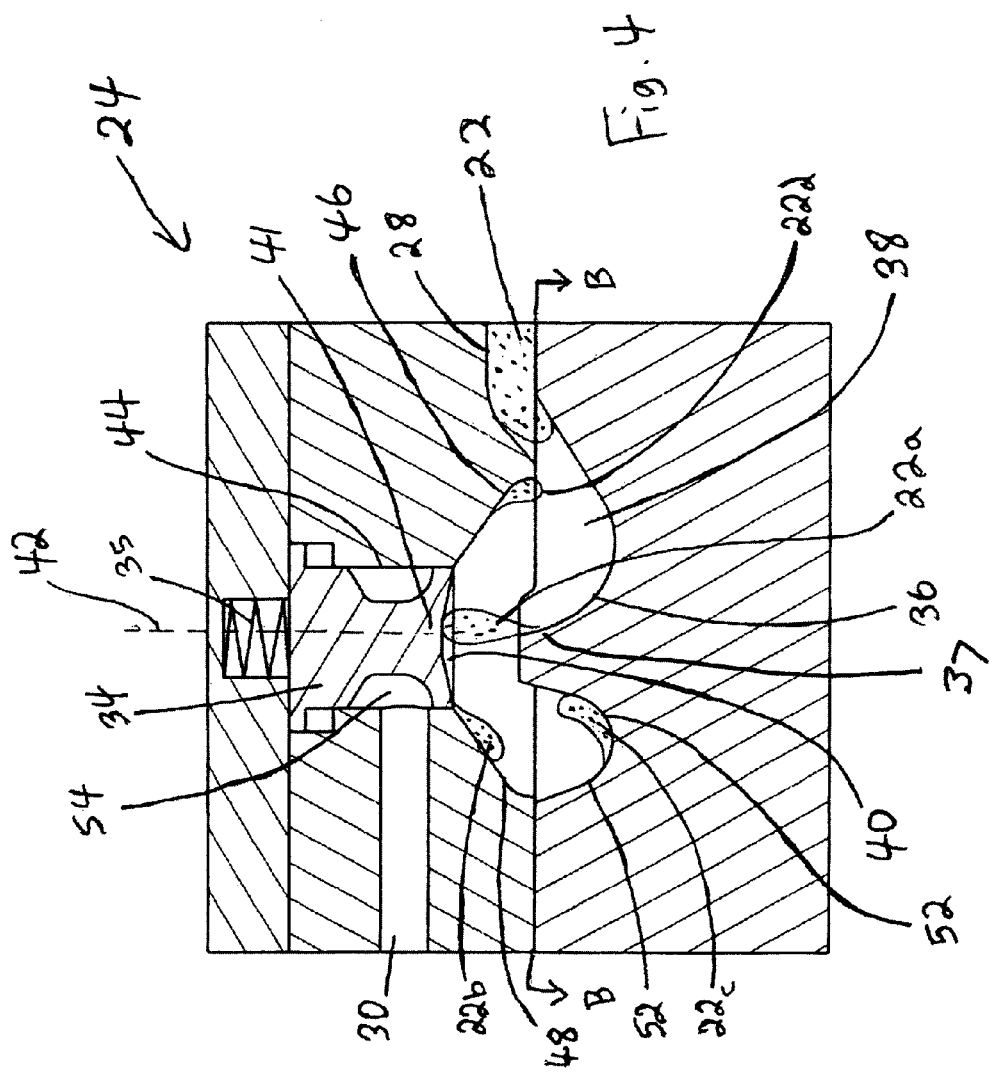
FIG. 4 is a cross section of the valve shown in FIG. 3 with the closure member in its closed position.

Referring now to FIG. 3, valve 24 is formed of upper portion 26 and lower portion 32. It will be appreciated that the term "upper" portion and "lower" portion is purely arbitrary as the mold may be oriented such that the mold halves are side by side, in which case portions 26 and 32 would be side to side and not one above the other. In the embodiment illustrated, inlet 28 is formed on portion 26; however, it may just as easily be formed one either portion 32 or partly on portion 32 and partly on portion 26. A valve chamber 38 is formed in the valve between portions 26 and 32. A spring biased closure member 34 is movably retained in the valve between inlet 28 and outlet 30. Closure 34 has an axis of movement 42 and is slidingly retained in sleeve 44 formed in portion 26. Closure 34 is movable along axis 42 between an open position as shown in FIG. 3 and a closed position as shown in FIG. 4. Closure 34 has cut outs 54 which permit air to pass through the valve when the closure is in its open position.

Closure 34 has a concave surface 40 formed on projection 41 which projects into valve chamber 38 such that the concave surface projects into the valve chamber. Valve 24 has a first wall 36 formed on portion 32 adjacent inlet 28. First wall 36 is shaped as a curve which is configured to direct the melt 22 passing through inlet 28 to be re-directed by 90° so as to directly impinge upon concave surface 40 of closure 34.

Preferably first wall 36 is shaped in a curved fashion such that the first wall applies a favorable pressure gradient to the melt as the melt encounters the first wall. The favorable pressure gradient ensures that the melt continues to flow and prevents separation of the flow to ensure that the flow does not become chaotic. This favorable pressure gradient allows for an efficient re-direction of the melt to impinge on closure 34 coaxially so as to efficient transfer momentum from the melt to the closure, thereby compelling the closure to move quickly from its open position to its closed position. A side wall 50 is formed in the valve adjacent inlet 28 to direct melt 22 towards first wall 36 and to ensure that the melt flows in a laminar fashion and that wall 36 can apply a favorable pressure gradient to the melt.

Peripheral walls 48, 46 and 52 are formed in the valve to re-direct the melt which has impinged on concave surface 40 back towards concave surface 40. It will be appreciated that surface 40, being concave, will redirect any melt which impinges upon it towards peripheral walls 48 and 46. Wall 48 is curved to ensure that the melt which has been re-directed by concave surface 40 is further re-directed towards peripheral wall 52, which further re-directs the melt back towards concave surface 40. Peripheral wall 46 is curved to ensure that any re-directed melt which impinges upon it from concave surface 40 is re-directed towards first wall 36 which again re-directs the melt back towards concave surface 40. Peripheral walls 48, 46 and 52 thereby ensure that a more complete transfer of momentum between melt 22 and closure member 34 is achieved.

Referring now to FIG. 4, closure 34, when in its closed position, closes off valve 24 to prevent the flow of melt out of outlet 30. As mentioned above, when melt 22 passes into chamber 38 from inlet 28, it is redirected by first wall 36. First wall 36 has a terminal edge 37 which is oriented to point towards axis 42 and direct the melt to travel coaxially with axis 42. Redirected melt 22a then impinges upon concave surface 40 substantially coaxially with axis of movement 42. Axis of movement 42 is coaxial with the axis of closure 34; therefore, the transfer of momentum between melt 22a and closure 34 is mostly coaxial to axis 42 permitting the closure to efficiently move towards its closed position. It will be appreciated that the melt 22 is traveling very quickly when it enters chamber 38, and the favorable pressure gradient applied by first wall 36 ensures that melt 22a remains moving as quickly as possible without slowing down and losing its momentum. When melt 22a hits concave surface 40, a majority of its momentum is transferred to closure 34, the remaining momentum being used to cause the melt which splashes off surface 40, namely melt 22b and 22d, to travel towards peripheral walls 48 and 46, respectively. Peripheral wall 48 redirects melt 22b (now 22c) back towards concave surface 40. Likewise, peripheral wall 46 redirects melt 22d towards first wall 36, which in turn redirects it back towards surface 40. Therefore, most of the remaining momentum of melts 22b, 22c and 22d are transferred to closure 34. Hence, very little melt 22 is required to cause closure 34 to move into its closed position and, therefore, very little melt will have the opportunity to escape into sleeve 44 and out of outlet 30. Biasing spring 35 is selected to apply sufficient biasing force to closure 34 to keep it in its open position until, but to permit the closure to move into its closed position when the first bit of melt 22a transfers its momentum to the closure. The inertia of closure 34 is overcome by the transfer of momentum from melt 22 to the closure. However, when closure 34 is in its closed position, the inertia of closure 34 keeps it in its closed position for a brief interval of time despite the biasing force of spring 35 (approximately 4 ms). During this brief interval of time, additional melt 22 enters chamber 38 which eventually fills the chamber and results in the melt applying positive pressure onto closure 34 keeping it in its closed position. The filling of chamber 38 with melt 22 requires time; therefore, biasing spring 35 must be carefully selected to ensure that the biasing force it exerts onto closure 34 is sufficient to ensure that the closure's inertia keeps the closure in its closed position long enough for the chamber to fill with melt.

Figure 6:
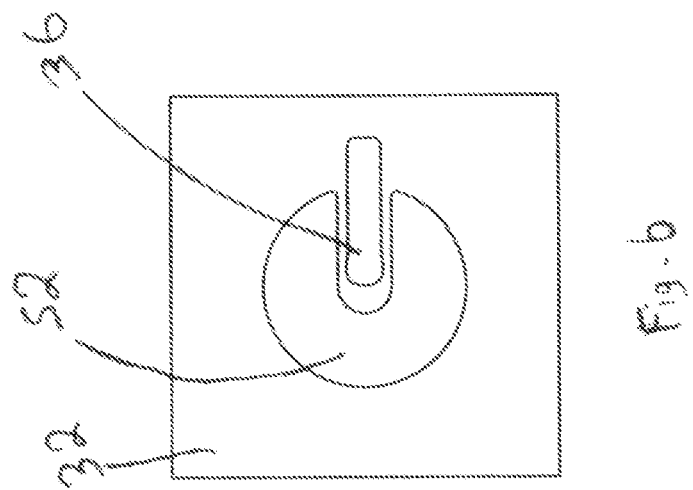
FIG. 6 is a top view of the lower valve component of the valve portion shown in FIG. 4 at line B-B.
Figure 5:
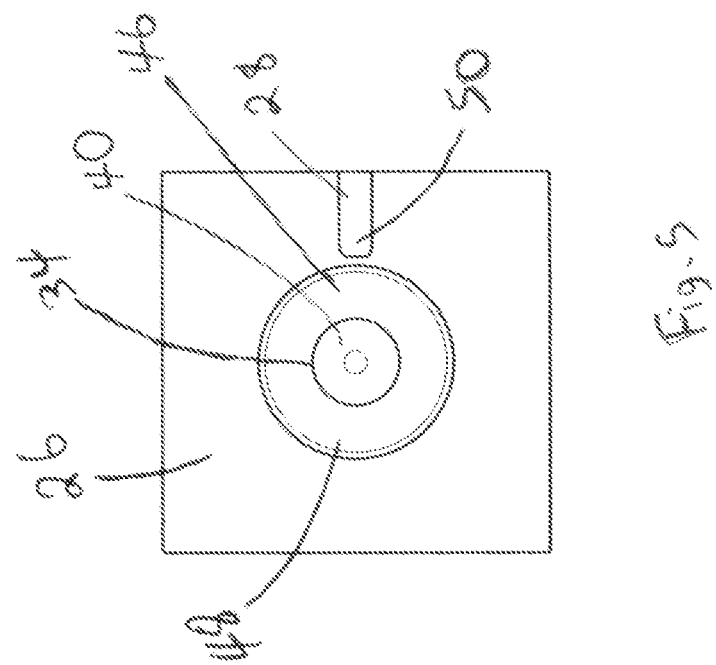
FIG. 5 is a bottom view of the upper valve component of the valve portion shown in FIG. 3 at line A-A.

Referring now to FIGS. 5 and 6, walls 48, 46 and ramp 50 are formed on the "underside" of portion 26 while walls 52 and 36 are formed on the "top side" of portion 32. As seen in FIGS. 7 and 8 respectively, portion 26 is formed on mold half 12 while portion 32 is formed on mold half 14. As a result, the valve is quite simple and requires only two moving parts, permitting the valve components to be machined as the mold halves are machined.

The present invention has several advantages over the prior art. Firstly, it is very simple to construct and requires only two moving parts, namely the closure and the biasing spring. The valve is also very fast acting since it closes off by transferring momentum from the fast moving melt to the closure rather than relying on the build up of pressure. The valve is also less prone to leakage and clogging as a result of melt working its way into the moving parts of the valve.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

Therefore, what is claimed is:

1. A valve for permitting gas to escape from a mold cavity when the mold cavity is injected with a melt, the valve comprising:
   an inlet coupled to the mold cavity;
   an outlet for venting gas from the mold cavity;
   a closure oriented substantially perpendicularly to the inlet and movable between open and closed positions for closing off the outlet, the closure having a central axis perpendicular to the inlet, the closure having a concave surface the valve having a first wall which is curved to redirect the melt passing through the inlet by about 90° and maintain a laminar flow in the melt and direct the melt to travel coaxially toward the closure so as to impinge substantially coaxially upon the closure on the concave surface and transfer a majority of the momentum of the melt to the closure;
   the first wall being configured to direct the melt to impinge directly on to the closure member by applying a pressure gradient to the melt so that the melt maintains its momentum as it passes against the first wall and impinges on to the closure, and wherein the valve further comprises a chamber coupled to and adjacent the inlet, the closure having a concave surface projecting into the chamber when the closure is in its open position, the first wall having a terminal edge, the first wall being curved sufficiently to point the terminal edge toward the axis of the closure and direct the melt to impinge directly on to the concave surface of the closure.

2. The valve of claim 1 wherein a ramp is formed in the valve adjacent the inlet, said ramp configured to direct the melt towards the first wall.

3. The valve of claim 1 further comprising peripheral walls formed in the chamber, the peripheral walls being curved sufficiently to redirect the melt which has impinged the concave surface back towards the concave surface.

4. The valve of claim 1 wherein the valve includes a pair of sidewalls adjacent the inlet for directing the melt towards the first wall.

5. The valve of claim 1 wherein the first wall is configured to prevent the formation of an adverse pressure gradient as the melt is directed by the first wall towards the surface.

* * * * *